US009086154B2

United States Patent
Simpson

(10) Patent No.: US 9,086,154 B2
(45) Date of Patent: Jul. 21, 2015

(54) BALL SHAFT FOR A LIQUID COOLANT VALVE

(71) Applicant: HAMILTON SUNDSTRAND CORPORATION, Windsor Locks, CT (US)

(72) Inventor: Scott W. Simpson, Easthampton, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 180 days.

(21) Appl. No.: 13/856,753

(22) Filed: Apr. 4, 2013

(65) Prior Publication Data

US 2014/0299808 A1 Oct. 9, 2014

(51) Int. Cl.
F16K 5/06 (2006.01)
F16K 5/12 (2006.01)
F16K 3/34 (2006.01)

(52) U.S. Cl.
CPC ... F16K 5/06 (2013.01); F16K 3/34 (2013.01); F16K 5/0605 (2013.01); F16K 5/12 (2013.01)

(58) Field of Classification Search
CPC ........... F16K 5/06; F16K 5/0605; F16K 3/34; F16K 5/12
USPC ........................ 251/208–209, 315.01, 315.16
See application file for complete search history.

(56) References Cited

U.S. PATENT DOCUMENTS

| | | | |
|---|---|---|---|
| 3,326,232 A * | 6/1967 | Stamps et al. | 251/207 |
| 3,707,161 A * | 12/1972 | Crawford | 137/269 |
| 4,041,556 A * | 8/1977 | Darling et al. | 251/31 |
| 4,130,128 A * | 12/1978 | Kaneko | 137/269 |
| 4,988,078 A * | 1/1991 | Otteman | 251/367 |
| 5,213,144 A * | 5/1993 | Campbell et al. | 251/148 |
| 5,305,785 A * | 4/1994 | Humber | 137/360 |
| 5,551,467 A * | 9/1996 | Booth et al. | 137/1 |
| 5,593,135 A * | 1/1997 | Lester et al. | 251/209 |
| 5,937,890 A * | 8/1999 | Marandi | 251/209 |
| 6,845,627 B1 | 1/2005 | Buck | |
| 7,024,874 B2 | 4/2006 | Zywiak et al. | |
| 7,231,778 B2 | 6/2007 | Rigney et al. | |
| 7,380,408 B2 | 6/2008 | Zywiak et al. | |
| 7,523,622 B2 | 4/2009 | Zywiak et al. | |
| 8,171,745 B2 | 5/2012 | Schroder | |
| 2004/0256590 A1* | 12/2004 | Pettinaroli | 251/315.01 |
| 2005/0127317 A1* | 6/2005 | Rebello | 251/209 |
| 2005/0210910 A1 | 9/2005 | Rigney et al. | |
| 2011/0253346 A1 | 10/2011 | Bartosz et al. | |
| 2012/0291459 A1 | 11/2012 | Millar et al. | |

FOREIGN PATENT DOCUMENTS

EP 1878660 A2 1/2008

* cited by examiner

*Primary Examiner* — John Bastianelli
(74) *Attorney, Agent, or Firm* — Cantor Colburn LLP

(57) ABSTRACT

A ball shaft for a coolant valve includes a body extending from a first end to a second end through an intermediate portion defining an axis of rotation, and a ball section formed on the intermediate portion. The ball section includes an outer surface, an inner surface that forms a coolant receptacle, and a slotted opening extending from the outer surface to the inner surface. The slotted opening includes a width of between about 0.0374" (0.9499 mm) and about 0.0364" (0.9246 mm).

14 Claims, 2 Drawing Sheets

BALL SHAFT FOR A LIQUID COOLANT VALVE

BACKGROUND OF THE INVENTION

Exemplary embodiments pertain to the art of liquid valves and, more particularly, to a ball shaft for a liquid coolant valve.

Many private and commercial aircraft include a galley for food preparation. Typically, the galley will include a cold storage area for food and beverages. A galley cooling system provides a refrigerant to the cold storage area. The galley cooling system includes one or more valves that control refrigerant flow to the cold storage area. The valve may include a ball shaft having a central opening that regulates refrigerant flow through the valve. More specifically, the ball shaft is rotated to selectively expose the central opening allowing refrigerant to flow from an inlet to an outlet.

BRIEF DESCRIPTION OF THE INVENTION

Disclosed is a ball shaft for a coolant valve including a body extending from a first end to a second end through an intermediate portion defining an axis of rotation, and a ball section formed on the intermediate portion. The ball section includes an outer surface, an inner surface that forms a coolant receptacle, and a slotted opening extending from the outer surface to the inner surface. The slotted opening includes a width of between about 0.0374" (0.696 mm) and about 0.0364" (0.670 mm).

Also disclosed is a coolant valve including a valve housing. The valve housing includes a valve body having a coolant inlet, a coolant outlet, and a metering portion arranged between the coolant inlet and coolant outlet. An actuator is mounted to the valve body, and a ball shaft is arranged in the valve body and operatively connected to the actuator. The ball shaft includes a body extending from a first end to a second end through an intermediate portion defining an axis of rotation, and a ball section formed on the intermediate portion and arranged in the coolant metering portion. The ball section includes an outer surface, an inner surface that forms a coolant receptacle and a slotted opening extending from the outer, annular surface to the inner surface. The slotted opening includes a width of between about 0.0374" (0.696 mm) and about 0.0364" (0.670 mm).

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
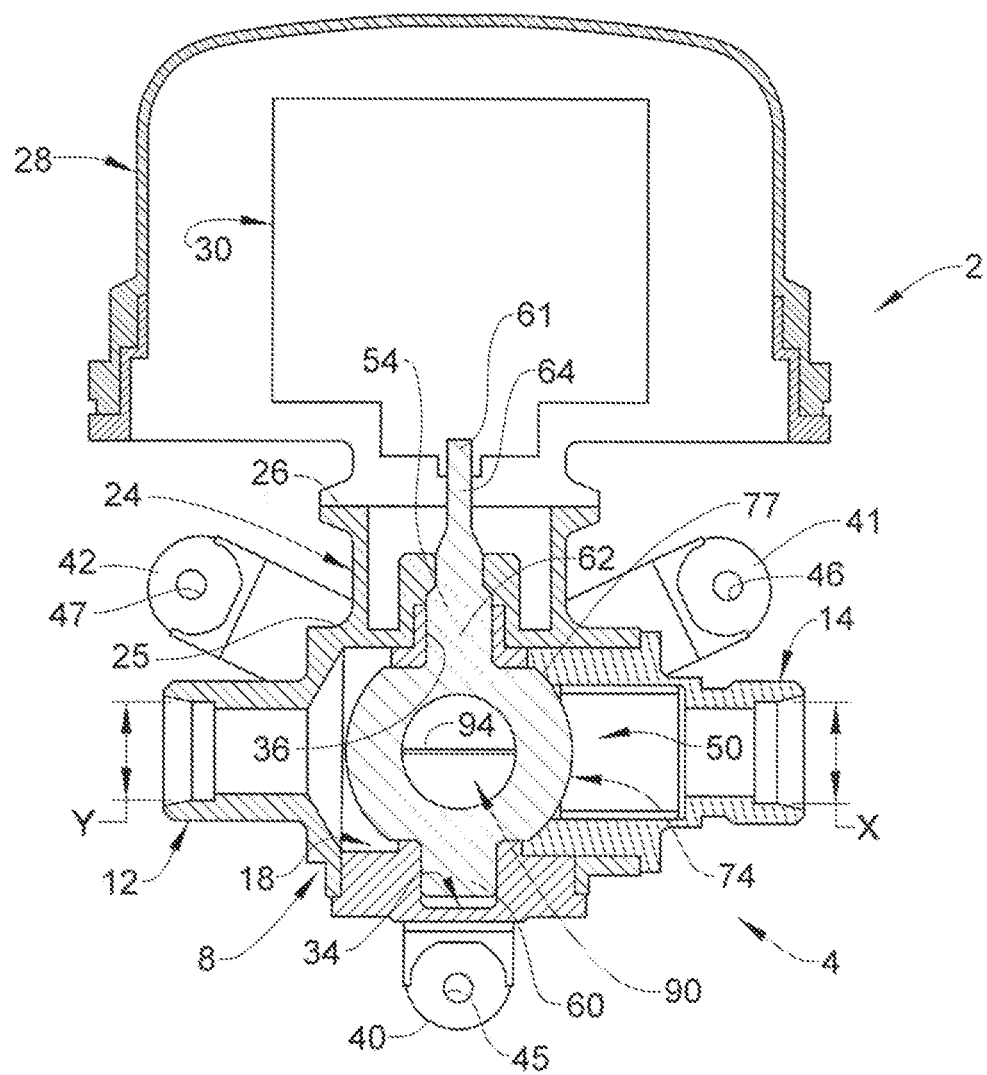
FIG. 1 is a cross-sectional view of a coolant valve having a ball shaft in accordance with an exemplary embodiment illustrated in a closed position.

A coolant valve, in accordance with an exemplary embodiment, is indicated generally at 2 in FIG. 1. Coolant valve 2 includes a valve housing 4 having a valve body 8. Valve body 8 includes a coolant inlet 12 and a coolant outlet 14. In the exemplary embodiment shown, coolant inlet 12 and coolant outlet 14 extend along a common axis. Coolant inlet 12 includes a flow area having a cross-sectional dimension or diameter having a dimension X. Coolant outlet 14 includes a cross-sectional dimension or diameter having a dimension Y. In accordance with an aspect of the exemplary embodiment, dimension X is in a range between about 0.25" (0.635 cm) and about 1.25" (3.17 cm). In accordance with another aspect of the exemplary embodiment, dimension X is about 0.5" (1.27 cm). In further accordance with the aspect of the exemplary embodiment, dimension Y is substantially similar to dimension X.

A metering portion 18 is arranged between coolant inlet 12 and coolant outlet 14. Metering portion 18 regulates an amount of coolant flowing from coolant inlet 12 to coolant outlet 14, as will be detailed more fully below. Valve body 8 also includes an actuator mounting member 24. Actuator mounting member 24 extends from a first end portion 25 to a second end portion 26. First end portion 25 is detachably mounted to valve body 8. An actuator housing 28 is connected to second end portion 26. Actuator housing 28 surrounds an actuator 30 that is selectively operated to fluidically connect coolant inlet 12 and coolant outlet 14. Valve body 8 is further shown to include a ball shaft receiving portion 34 and a ball shaft passage portion 36 that extends from metering portion 18 through actuator mounting member 24 toward actuator 30. Valve body 8 also includes a plurality of mounting members 40, 41 and 42. Each mounting member 40, 41 and 42 includes a corresponding opening 45, 46 and 47 that receives a mechanical fastener (not shown) for securing coolant valve 2 to structure.

In accordance with an exemplary embodiment, coolant valve 2 includes a ball shaft 50 arranged in metering portion 18 of valve body 8. Ball shaft 50 is selectively shifted between a closed position (FIG. 1) and an open position (FIG. 2) allowing coolant to flow from coolant inlet 12 to coolant outlet 14. Ball shaft 50 includes a body 54 that extends from a first end 60 to a second end 61 through an intermediate portion 62. An axis of rotation 64 extends from first end 60 to second end 61. First end 60 nests within ball shaft receiving portion 34 while second end 61 extends through ball shaft passage portion 36 and connects with actuator 30. Ball shaft 50 includes a ball section 74 arranged between first end 60 and second end 61 at intermediate portion 62. Ball section 74 includes an outer, substantially spherical surface 77 and a substantially spherical inner surface 79 that defines a coolant receptacle 82. A metering window 90 extends from outer annular surface 77 to inner surface 79 and opens to coolant receptacle 82. Metering window 90 provides a passage that enables coolant entering coolant inlet 12 and coolant receptacle 82 to pass to coolant outlet 14. Ball section 74 also includes an opening 92 arranged opposite metering window 90. Opening 92 allows fluid to pass into coolant receptacle 82 and flow through metering window 90 toward coolant outlet 14.

Figure 2:
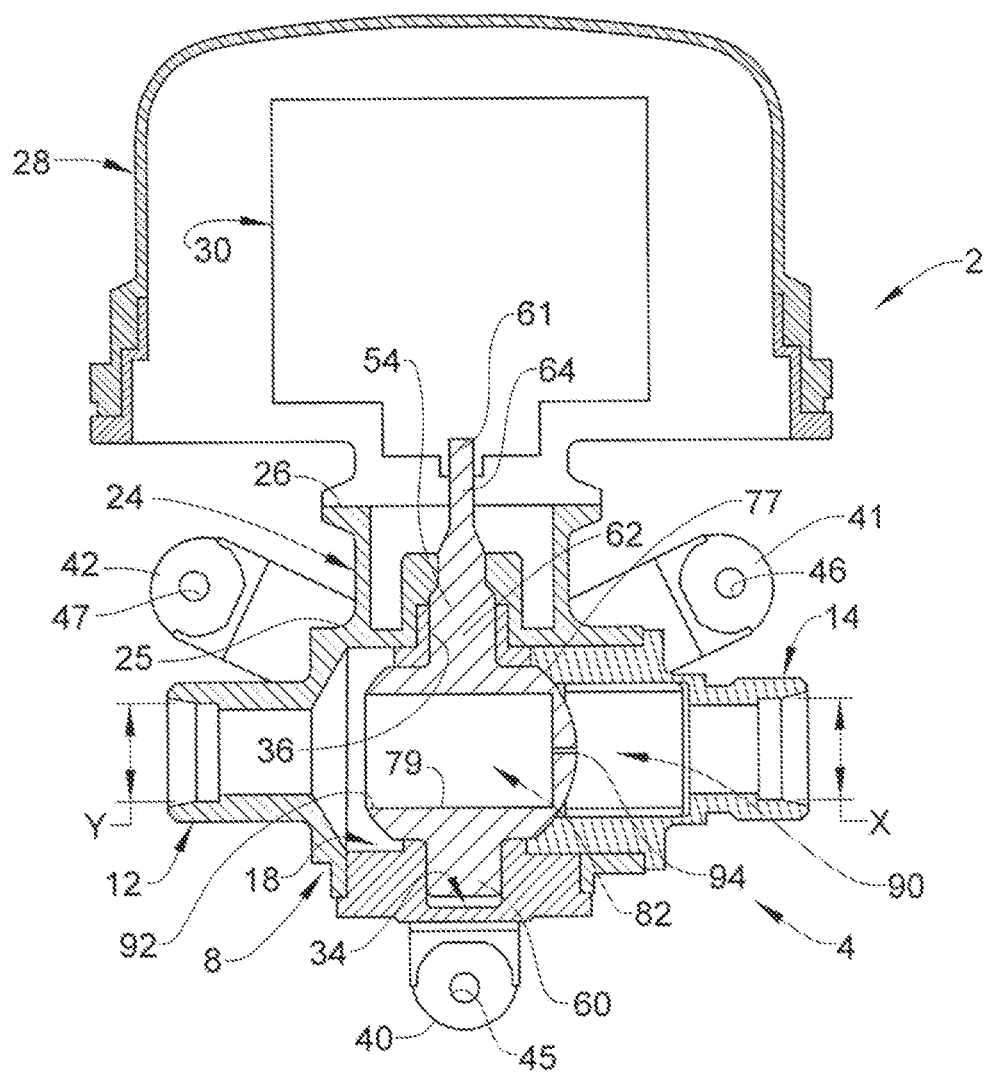
FIG. 2 is a cross-sectional view of the coolant valve of FIG. 1 illustrated in an open position.
Figure 3:
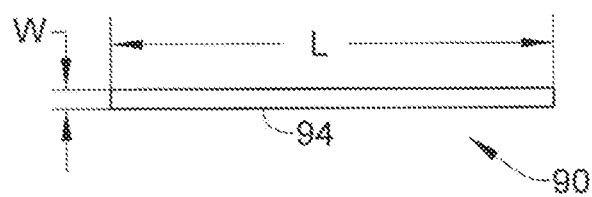
FIG. 3 is a partial plan view of the ball shaft including a metering window in accordance with an exemplary embodiment.

Reference will now be made to FIG. 3 in describing metering window 90. Metering window 90 takes the form of a slotted opening 94 having a length ("L") and a width ("W"). Width ("W") extends along an axis that is substantially parallel to axis of rotation 64 while length ("L") extends along an axis that is substantially perpendicular to axis of rotation 64. Further, as will become more readily apparent below, length ("L") is greater than width ("W"). In accordance with an aspect of the exemplary embodiment, length ("L") has a dimension in a range between about 0.835" (21.209 mm) and about 0.825" (20.995 mm). In accordance with another aspect of the exemplary embodiment, length ("L") has a dimension of about 0.83" (21.08 mm). In this manner, when in the open configuration, such as shown in FIG. 2, fluid enters inlet 12 and flows through opening 92 into coolant receptacle 82. The coolant flows from coolant receptacle 82 via metering window 90 at a desired flow rate before passing from coolant outlet 14. In accordance with yet another aspect of the exemplary embodiment, width ("W") includes a dimension in a range between about 0.0374" and about 0.0364" (0.9245 mm). In accordance with still yet another aspect of the exemplary embodiment, width ("W") has a dimension of about 0.0369" (0.9373 mm). In accordance with still another aspect of the exemplary embodiment, metering window 90 includes an effective flow area of about 0.021 in$^2$ (13.548 mm$^2$) to about 0.023 in$^2$ (14.839 mm$^2$). In accordance with another aspect of the exemplary embodiment, the effective flow area is about 0.022 in$^2$ (14.194 mm$^2$). The particular dimensions of metering window provide desired flow characteristics of coolant passing from coolant inlet 12 to coolant outlet 14.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A ball shaft for a coolant valve comprising:
   a body extending from a first end to a second end through an intermediate portion defining an axis of rotation;
   a ball section formed on the intermediate portion, the ball section including an outer surface, an inner surface that forms a coolant receptacle and a slotted opening extending from the outer annular surface to the inner surface, the slotted opening including a width of between about 0.0374" (0.9499 mm) and about 0.0364" (0.9246 mm) and wherein the slotted opening defines a metering window having an effective flow area of between about 0.021 in$^2$ (13.548 mm$^2$) to about 0.023 in$^2$ (14.839 mm$^2$) that is configured and disposed to pass a predetermined about of coolant into the coolant receptacle.

2. The ball shaft according to claim 1, wherein the slotted opening has a width of about 0.0369" (0.9373 mm).

3. The ball shaft according to claim 1, wherein the slotted opening includes a length of between about 0.835" (21.209 mm) and about 0.825" (20.955).

4. The ball shaft according to claim 1, wherein the slotted opening includes a length of about 0.83" (21.08 mm).

5. The ball shaft according to claim 1, wherein the effective flow area is about 0.022 in$^2$ (14.194 mm$^2$).

6. A coolant valve comprising:
   a valve housing including a valve body having a coolant inlet, a coolant outlet and a metering portion arranged between the coolant inlet and coolant outlet;
   an actuator mounted to the valve body; and
   a ball shaft arranged in the valve body and operatively connected to the actuator, the ball shaft comprising:
      a body extending from a first end to a second end through an intermediate portion defining an axis of rotation;
      a ball section formed on the intermediate portion and arranged in the metering portion, the ball section including an outer surface, an inner surface that forms a coolant receptacle and a slotted opening extending from the outer annular surface to the inner surface, the slotted opening including a width of between about 0.0374" (0.9499 mm) and about 0.0364" (0.9246 mm) and wherein the slotted opening defines a metering window having an effective flow area of between about 0.021 in$^2$ (13.548 mm$^2$) to about 0.023 in$^2$ (14.839 mm$^2$) that is configured and dispose to pass a predetermined about of coolant into the coolant receptacle.

7. The coolant valve according to claim 6, wherein the slotted opening has a width of about 0.0369" (0.9373 mm).

8. The coolant valve according to claim 6, wherein the slotted opening includes a length between about 0.835" (21.209 mm) and about 0.825" (20.955 mm).

9. The coolant valve according to claim 8, wherein the slotted opening includes a length of about 0.83" (21.08 mm).

10. The coolant valve according to claim 6, wherein the effective flow area is about 0.022 in$^2$ (14.194 mm$^2$).

11. The coolant valve according to claim 6, wherein one of the coolant inlet and the coolant outlet includes a cross-sectional dimension between about 0.25" (0.635 cm) and about 0.1.25" (3.17 cm).

12. The coolant valve according to claim 11, wherein the cross-sectional dimension of the one of the coolant inlet and the coolant outlet is about 0.5" (1.27 cm).

13. The coolant valve according to claim 6, wherein each of the coolant inlet and the coolant outlet includes a cross-sectional dimension between about 0.25" (0.635 cm) and about 1.25" (3.17 cm).

14. The coolant valve according to claim 13, wherein the cross-sectional dimension of each of the coolant inlet and the coolant outlet is about 0.5" (1.27 cm).

* * * * *